3,158,653
PREPARATION OF ALKYLATED DECABORANE
Hugo Stange, Niagara Falls, N.Y., assignor, by mesne assignments, to Olin Mathieson Chemical Corporation, a corporation of Virginia
No Drawing. Filed Oct. 31, 1955, Ser. No. 544,068
8 Claims. (Cl. 260—606.5)

This invention relates to a new process for the preparation of liquid alkylated decaboranes. The materials produced by the process can be employed as fuels in the manner described in Altwicker, Garrett, Harris and Weilmuenster application Serial No. 497,407, filed March 28, 1955, and issued as U.S. Patent No. 2,999,117 on September 5, 1961.

It is known in the art to prepare decaborane. The material is a stable, white crystalline solid which melts at 99.5° C. and which boils at 213° C. Decaborane is a boron hydride of very high boron content. It has a very high heat of combustion indicating its utility as a high energy fuel. Being a solid, however, decaborane is not conveniently handled and this detracts from its utility for fuel purposes.

In accordance with the present invention, it has been discovered that decaborane and alkyl monohalides having from 1 to 5 carbon atoms in the alkyl radical can be reacted in admixture with alkyl aluminum sesquihalides containing from 1 to 4 carbon atoms in each alkyl radical to form alkylated decaboranes. The alkylated decaboranes produced by the reaction using the alkyl aluminum sesquihalide as the alkylation catalyst contain from 1 to 6 alkyl groups attached to each decaborane nucleus. The products produced in accordance with the present invention are borohydrocarbons of relatively high boron content and at the same time they are liquids, so that they constitute a conveniently handled fuel of considerably greater energy content than the simple hydrocarbon fuels.

The following examples illustrate in detail various procedures falling within the scope of this invention but are to be considered not limitative thereof.

*Example I*

The alkylation catalyst used in this experiment, ethyl aluminum sesquibromide, was prepared according to the method of Grosse, A. V., and Mavity, J. M., J. Org, Chem. 5, 106–21 (1940).

Ethylbromide, 21.8 g. (0.2 mole), decaborane, 12.2 g. (0.1 mole), and ethyl aluminum sesquibromide $((C_2H_5)_3Al_2Br_3)$, 3.9 g. (0.01 mole), prepared as indicated above, were mixed together in a 200 ml. flask equipped with a magnetic stirrer and heated with a microburner until the evolution of gas was noted. During the reaction nitrogen was passed continuously through the apparatus and finally through a flask filled with water in order to trap the hydrogen halide evolved. The probable internal temperature was 40° C. at this point. Twenty minutes were required for the evolution of 0.100 mole of hydrogen bromide. At this point the reaction was stopped by the addition of 50 ml. of distilled water. The products and unreacted decarborane were dissolved in 50 ml. of benzene and washed with three 40 ml. portions of distilled water. Cloudiness in the benzene solution was removed by agitation with a small amount of magnesium sulfate. The recovery of decaborane upon distillation was 1.7 g. which corresponds to 12 percent of the decaborane charged. The yield of colorless liquid product boiling at 70°–102° C. at 0.5 mm. of Hg was 12.4 g. This product, which consisted principally of alkylated decaboranes, was identified by infrared analysis as a mixture which was primarily mono- and diethyldecaborane. This is a corrected yield of 94 percent based on mono-alkylation of the decaborane. The boron content of the liquid was found by analysis to be 59.82 percent by weight.

*Example II*

In this experiment methyl aluminum sesquibromide was used as a catalyst in the alkylation of decaborane with ethyl bromide.

The methyl aluminum sesquibromide $((CH_3)_3Al_2Br_3)$ utilized as a catalyst in this experiment was prepared by the method of Grosse, A. V., and Mavity, J. M., J. Org. Chem. 5, 106–21 (1940). Granular aluminum, 27.0 g. (1.00 g. atom), was placed in a 300 ml. flask which was equipped with a magnetic stirrer. The flask was heated by means of a mantle to a skin temperature of 150° C. Addition of 71.0 g. (0.75 mole) of methyl bromide to the flask at this temperature produced no reaction even in the presence of 2 or 3 crystals of iodine. Addition of 0.1 g. of aluminum bromide to the flask at 150° C. resulted in fuming and a rise in temperature to over 170° C. At this point external heating was decreased and methyl bromide, 142 g. (1.5 mole) (71 g. of which had been previously charged and had been refluxed back to the addition funnel), was added drop-wise over a period of 2½ hours through an addition funnel situated directly over the flask. The heat of the reaction was sufficient to maintain a temperature of 140±40° C. during the addition of methyl bromide and for approximately one hour after refluxing of the methyl bromide had ceased. A cold finger, filled with Dry Ice, was attached directly above the addition funnel and connected to the reaction flask through a side arm so that vapors from the reaction mixture might be condensed and passed again into the addition funnel. The brown liquid product was distilled at 7.5 mm. of Hg pressure and 58 ml. of a colorless liquid, boiling at 52°–63° C., was collected. This fraction contained the dimethyl aluminum bromide. The methyl aluminum dibromide fraction was concentrated in the fraction boiling at 70°–95° C. at 12 mm. of Hg. The dimethyl aluminum bromide was further purified by distilling through a Vigreux column and 32 ml. of a colorless liquid boiling at 47–54° C. at 13–15 mm. of Hg was collected. The methyl aluminum dibromide was not further purified.

The apparatus used in carrying out the alkylation of decaborane with the catalyst, methyl aluminum sesquibromide, consisted of a 200 ml. flask equipped with a magnetic stirrer and fitted with a Dry-Ice condenser. Superimposed above the flask was an addition funnel which was connected by a side arm to the upper part of the reaction flask. This side arm allowed vapors to pass from the reaction flask to an entrance point on the addition funnel above the liquid level of the addition funnel. In this experiment, decaborane, 12.2 g. (0.1 mole), and ethyl bromide, 21.8 g. (0.2 mole) were placed in a 200 ml. flask fitted with a Dry-Ice condenser and addition funnel containing dimethyl aluminum bromide. Five ml.

of the dimethyl aluminum bromide was added to the reaction flask while the mixture was heated from 20° to an external temperature of 100° C. over a two-hour period. No reaction was evident. At the latter temperature 4 or 5 wet crystals (0.5 g.) of the methyl aluminum dibromide concentrate was added. The external temperature was raised by means of a heating mantle to 110° C. and at this point there was a sudden surge of pressure which disrupted the apparatus. During the remaining stage of the reaction the reactants were maintained at an external temperature of 100°–140° C. for 2½ hours. The reaction was stopped by the addition of 50 ml. of distilled water. Benzene was used to extract the products which were then separated by distillation at reduced pressure. From the distillation 4.56 g. of liquid alkylated decaboranes boiling at 63–101° C. at 0.6 mm. of Hg was obtained. By analysis the product was shown to contain 61.68 percent boron. The conversion of decaborane was 58 percent and the yield of ethyldecaboranes was 52 percent.

*Example III*

In this experiment methyl aluminum sesquichloride $((CH_3)_3Al_2Cl_3)$ was employed as a catalyst in the alkylation of decaborane.

To an autoclave of 250 ml. capacity which was equipped wtih a solenoid stirrer were added 13.5 g. of powdered aluminum, 13.5 g. of granular aluminum of 8 mesh size, and approximately 0.1 g. of powdered aluminum trichloride. The autoclave was then sealed and placed in a bath maintained at $-78°$ C. A total of 76 g. of methyl chloride was added to the autoclave in increments of 33, 14 and 29 g. over a period of several hours while the autoclave was held at $-78°$ C. These additions were made when there appeared to be no further reaction occurring. The total reaction time was 114 hours during which the temperature ranged from $-78°$ C. to 24° C. with the exception of several periods totaling 2 hours when heat was applied to the autoclave and the temperature rose from 24° C. to 50° C.

The autoclave was opened in a dry box with a nitrogen atmosphere and the reaction mixture poured into a flask. After the flask had been removed from the dry box, the reaction mixture was distilled. A total of 63.9 g. of colorless sesquichloride was collected over the temperature range 69–84° C. at a pressure of 59–78 mm. of Hg. Hydrolysis of a sample of the sesquichloride and a measurement of the methane evolved indicated the mole fraction of methyl aluminum dichloride to be 0.52.

In the second step of this experiment the catalyst, methyl aluminum sesquichloride $((CH_3)_3Al_2Cl_3)$, was utilized as an alkylation catalyst. The apparatus employed was a three-necked, 300 ml. flask equipped with a thermometer, nitrogen inlet, and a Y-tube connected to a condenser filled with Dry Ice and an addition funnel filled with methyl chloride.

Decaborane, 12.2 g. (0.1 mole), and methyl chloride, 40 ml. (0.8 mole), were added to the reaction flask and mixed together at $-24°$ C. In the next step 1.0 ml. (0.006 mole) of $((CH_3)_3Al_2Cl_3)$ was added. At the end of two hours and eight minutes 40 ml. of methylene chloride which served as a solvent for the reactants, was added and the temperature allowed to rise. After 87 minutes with the temperature at 16° C., an additional 0.5 ml. (0.003 mole) of $(CH_3)_3Al_2Cl_3$ was added and the reaction allowed to proceed for an additional 22 minute period. After a total reaction time of 3 hours and 57 minutes the reaction was stopped by the addition of 50 ml. of water. Two layers formed, a bottom layer, or organic layer, which contained unreacted decaborane and the alkylated decaboranes, and the top layer, or aqueous layer, which contained the aluminum salts from the catalyst. The organic layer was separated from the water layer and dried over magnesium sulfate. The methylene chloride and unreacted methyl chloride from this layer were removed from the crude liquid alkylated product under reduced pressure and trapped in a cold trap maintained at $-78°$ C. The residue, containing the crude alkylated product, was dissolved in about 50 ml. of n-pentane and the solution cooled to $-78°$ C. In the next step the slurry was filtered and crystallized decaborane in the amount 3.04 g. was removed. Distillation of the filtrate yielded 9.35 g. of a colorless liquid boiling at 52–64° C. under a pressure of 0.95 mm. of Hg. About 0.5 g. of a viscous yellow liquid remained in the distilling flask. By infrared analysis it was shown that the liquid product consisted mainly of mono- and dimethyl decaborane with some tri- and tetramethyldecaborane present. The boron content of the product was found by analysis to be 73.35, 73.18 percent. (The calculated value for methyldecaborane ($CH_3B_{10}H_{13}$) is 79.4 percent.). The percent conversion of decaborane was 75.1 and the percent yield, assuming that the product was all monomethyldecaborane, was 91.5.

*Example IV*

In this experiment ethyl aluminum sesquichloride $((C_2H_5)_3Al_2Cl_3)$ was used as an alkylation catalyst for decaborane. The autoclave employed in the preparation of this catalyst was of 250 ml. capacity and was equipped with a rupture disc, a pressure gauge and a stirrer. Granular aluminum in the amount of 27.0 g. was placed in the autoclave and the autoclave sealed and evacuated. In the next step 4 ml. (0.02 mole) of ethyl aluminum sesquibromide was admited to the autoclave. The autoclave was cooled in an ice bath and 16 g. of ethyl chloride was added. The autoclave was closed and heated with stirring to 33° C. After standing over-night at room temperature the reactants exerted a pressure of 0 p.s.i.g. An additional 40 g. of ethyl chloride was admitted by cooling the bomb. After the bomb had been stirred at room temperature for 4 hours a rise in temperature to 41° C. and a drop in pressure to 9 p.s.i.g. were noted. In the next step the bomb was again cooled in a Dry Ice bath and the remaining 40 g. of ethyl chloride was added. After being allowed to stand at room temperature overnight the bomb was heated to 82° C.; the pressure at this point was 49 p.s.i.g. As soon as the bomb had cooled it was vented and disassembled in a dry box with a nitrogen atmosphere. Approximately 5 g. of unreacted aluminum was present in the bomb. The grayish-black liquid present was decanted from the bomb and distilled at reduced pressure to give 78 ml. of a colorless liquid boiling at 86.5–96.5° C. at 12 mm. of Hg. The density was found to be approximately 1.24 g. per ml. By hydrolysis of a weighed sample and measurement of the ethane evolved, the liquid was found to be an almost equal molar mixture of $(C_2H_5)_2AlCl$ and $$C_2H_5AlCl_2$$

The apparatus used for the alkylation of decaborane with ethyl aluminum sesquichloride as a catalyst consisted of a 300 ml., three-necked flask fitted with a condenser filled with Dry Ice, a nitrogen inlet, a thermometer and addition funnel. During the reaction the reactants were mixed by means of a magnetic stirrer and the system was continually swept with a nitrogen stream which then was passed through a trap filled with water in order to dissolve the hydrogen chloride evolved. The entire system was flushed with nitrogen before starting the experiment.

To the flask were added 12.2 g. (0.1 mole) of decaborane and 2 ml. (0.01 mole) of ethyl aluminum sequichloride. The ethyl chloride, 17.5 ml. (0.25 mole) was then added drop-wise over a period of 18 minutes. At the end of this time the reaction was stopped by the addition of 50 ml. of distilled water. By titration with a standard base it was determined that a total of 0.1 mole of hydrogen chloride had been dissolved in the trap filled with water.

The reaction mixture was dissolved in 50 ml. of cyclohexane and the water layer formed was washed with cyclohexane. Cyclohexane extracts were dried over magnesium sulfate and the drying agent was filtered off. In the next step the cyclohexane was removed under reduced pressure. Distillation of the crude product under reduced pressure was continued and a total of 1.03 g. of decaborane was recovered followed by 13.16 g. of a colorless alkylated liquid boiling over the range of 64–114° C. at 0.5 mm. of Hg. A total of 2.05 g. of viscous liquid remained in the distilling flask. By analysis, the colorless liquid alkylated product was found to contain 57.7 percent boron. The percent conversion of decaborane in this experiment was 92 and the percent yield, assuming that the product was entirely monoethyl-decaborane, was 96.

Example V

The apparatus used in this experiment was the same as that described in Example III. To the 300 ml., three-necked reaction flask was added 12.2 g. (0.1 mole) of decaborane and 0.2 ml. (0.001 mole) of ethyl aluminum sesquichloride, prepared according to the method of Example IV. Ethylchloride, in the amount of 17.5 ml. (0.25 mole), was added immediately over a period of 1.5 minutes. During the experiment the temperature was maintained at 14° C., plus or minus 6° C. A total of 0.1 mole of hydrogen chloride was evolved during the 80 minute reaction period. At the end of this time the reaction was stopped by the addition of 50 ml. of distilled water. The crude liquid alkylated products were then taken up in 40 ml. of n-pentane which was separated from the aqueous layer and dried over magnesium sulfate. After the drying agent had been filtered off, the pentane solution was cooled to −78° C. to precipitate unreacted decaborane. The slurry was filtered and 4.09 g. of decaborane was recovered. In the next step the pentane was removed under reduced pressure and the residue distilled. During the first stages of the distillation operation, 0.03 g. of decaborane was recovered and in the second stage of the distillation operation 10.44 g. of liquid alkylated decaboranes, boiling at 57–86° C. at a pressure of 0.35 mm. of Hg, was obtained. By analysis, the liquid alkylated product was shown to contain 63.8 percent boron. The conversion of decaborane was 66.2 percent and the yield was 105 percent based on the assumption that the entire product was monoethyldecaborane ($C_2H_5B_{10}H_{13}$).

Example VI

The apparatus used in this experiment was identical to that described under Example IV. To the 300 ml., three-necked reaction flask was added 12.2 g. (0.1 mole) of decaborane, 40 ml. of methylene chloride and 12.5 ml. (0.18 mole) of ethyl chloride. In the next step 0.4 ml. (0.002 mole) of ethyl aluminum sesquichloride was added to the mixture. During the reaction period of 41 minutes, during which time the temperature was maintained at 26±2° C., there was evolved 0.072 mole of hydrogen chloride. The reaction was stopped by the addition of 50 ml. of distilled water. The methylene chloride layer containing alkylated decaborane products was separated and dried over magnesium sulfate. After removal of the drying agent the solution was cooled to −78° C. in order to precipitate any unreacted decaborane. Filtration of the cold solution resulted in the recovery of 3.58 g. of decaborane. Methylene chloride was removed by distillation under reduced pressure and 8.96 g. of liquid alkylated decaboranes boiling at 57°–75° C. under a pressure of 0.3 mm. of Hg, was collecteed. During the distillation operation 0.67 g. of decaborane was recovered. By analysis, the liquid alkylated product was shown to contain 68.2 percent boron. The percent conversion of decaborane was 65.1 and the percent yield, based on the assumption that the entire product was monoethyldecaborane ($C_2H_5B_{10}H_{13}$), was 91.9.

Example VII

The apparatus used in this experiment was identical to that described under Example IV. To the 300 ml., three-necked flask were added 12.2 g. (0.1 mole) of decaborane, 43 ml. (0.60 mole) of ethyl chloride and 0.4 ml. of ethyl aluminum sesquichloride. In this experiment the quantity of ethyl chloride added was sufficient to dissolve all the decaborane. During the 39 minute reaction period the temperature was maintained at 10° C., ±4° C., and 0.073 mole of hydrogen chloride was evolved. The reaction was terminated by the addition of 50 ml. of distilled water.

In the next step of the product was dissolved in about 50 ml. of n-pentane and the organic layer containing the n-pentane with the crude alkylated decaboranes, was separated from the aqueous layer. The pentane layer was dried over magnesium sulfate and the pentane layer separated by decantation. In order to separate the unreacted decaborane, the pentane solution was cooled to −78° C. and filtered. A total of 4.38 g. of decaborane was recovered during this filtration operation. The filtrate was distilled at reduced pressure and 9.79 g. of liquid alkylated decaboranes boiling at 59–80° C. under a pressure of 0.4 mm. of Hg was obtained.

By analysis the alkylated product was shown to contain 68.3 percent boron. The conversion of decaborane was 64.1 percent and the yield, based on the assumption that the entire product was monoethyldecaborane ($C_2H_5B_{10}H_{13}$) was 102 percent.

Various modifications can be made in the procedures of the specific examples to provide other embodiments which fall within the scope of this invention. Thus, in place of the methyl chloride, ethyl bromide and ethyl chloride utilized as reactants, there can be substituted equivalent amounts of other alkyl monohalides having from 1 to 5 carbon atoms, such as methyl bromide, methyl iodide, ethyl iodide, n-propyl chloride, isopropyl chloride, n-butyl chloride, isobutyl bromide, secondary butyl chloride, tertiary butyl iodide, n-amyl chloride, n-amyl bromide, and the like. The relative proportions of alkyl monohalide and decaborane used can be varied widely, generally being within the range from about 0.5 mole of alkyl halide to 1 mole of decaborane to 10 moles of alkyl halide to 1 mole of decaborane. The preferred range for the molar ratio of alkyl halide to decaborane is from 1 mole of alkyl halide to 1 mole of decaborane to 3 moles of alkyl halide to 1 mole of decaborane. If desired, the reaction can be conducted in such manner that excess alkyl halide serves as a solvent for the reactants, and in commercial practice it may be advantageous to operate with large excesses of decaborane. The use of solvents as a reaction medium permits the reaction to proceed in liquid phase to give products which have substantially higher boron contents and at the same time results in increased conversions. Saturated straight chain hydrocarbons such as n-pentane or kerosene or chlorinated solvents of the methylene chloride type are satisfactory. When low boiling solvents are used, pressure can be employed for the purposes of retaining the solvent in the liquid phase.

The quantity of alkyl aluminum sesquihalide employed as a catalyst can also be varied considerably, generally being within the range from about 0.01 mole of sesquihalide per mole of decaborane to 0.1 mole of sesquihalide per mole of decaborane. Likewise, the reaction temperature used is subject to considerable variation, generally being within the range from 0° C. to 100° C.

It is claimed:

1. A method for the preparation of an alkylated decaborane which comprises reacting decaborane and an alkyl monohalide selected from the class consisting of alkyl monochlorides, alkyl monobromides and alkyl monoiodides having from 1 to 5 carbon atoms while the reactants are in admixture with as an alkylation catalyst a catalytic amount of an alkyl aluminum sesquihalide selected from the class consisting of alkyl aluminum sesquichlorides and alkyl aluminum sesquibromides having from 1 to 4 carbon atoms in each alkyl radical.

2. The method of claim 1 wherein the molar ratio of alkyl monohalide to decaborane is within the range from 0.5:1 to 10:1, wherein the molar ratio of alkyl aluminum sesquihalide to decaborane is within the range from 0.01:1 to 0.1:1 and wherein the reaction temperature is within the range from 0° C. to 100° C.

3. The method of claim 2 wherein the alkylmonohalide is ethyl bromide.

4. The method of claim 2 wherein the alkyl monohalide is ethyl chloride.

5. The method of claim 2 wherein the alkyl monohalide is methyl chloride.

6. The method of claim 2 wherein the alkyl aluminum sesquihalide is ethyl aluminum sesquichloride.

7. The method of claim 2 wherein the alkyl aluminum sesquihalide is methyl aluminum sesquichloride.

8. A method for preparing an alkyl decaborane which comprises reacting decaborane and a lower alkyl monohailde in the presence of a lower alkylaluminum sesquihalide catalyst and recovering the alkyl decaborane produced.

No references cited.

TOBIAS E. LEVOW, *Primary Examiner.*

WILLIAM G. WILES, LEON D. ROSDOL, ROGER L. CAMPBELL, *Examiners.*